United States Patent
Goddi et al.

(10) Patent No.: US 8,736,547 B2
(45) Date of Patent: May 27, 2014

(54) METHOD AND SYSTEM FOR INTERFACING A DIGITAL DEVICE WITH AN INTERACTIVE DISPLAY SURFACE

(75) Inventors: Patrick M. Goddi, Palo Alto, CA (US); Nelson Liang An Chang, Palo Alto, CA (US); I-Jong Lin, Palo Alto, CA (US); Joshua Tyler, Palo Alto, CA (US); Andrew Dahley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/408,496

(22) Filed: Apr. 20, 2006

(65) Prior Publication Data

US 2007/0266185 A1    Nov. 15, 2007

(51) Int. Cl.
*G09G 5/00* (2006.01)

(52) U.S. Cl.
USPC .......................................... 345/156

(58) Field of Classification Search
USPC ................... 345/156–183, 204, 419; 178/18.01–20.01; 710/8; 709/228
See application file for complete search history.

(56) References Cited

U.S. PATENT DOCUMENTS

| 2003/0011685 A1 | 1/2003 | Oka et al. |
| 2003/0025738 A1 | 2/2003 | Polgar et al. |
| 2006/0284874 A1* | 12/2006 | Wilson .......................... 345/473 |
| 2006/0294247 A1 | 12/2006 | Hinckley |

FOREIGN PATENT DOCUMENTS

| EP | 1282032 | 2/2003 |
| JP | 2002204239 A | 7/2000 |

OTHER PUBLICATIONS

Ayatsuka et al: HyperPalette: A Hybrid Computing Environment for small computing devices. CHI 2000 Extended Abstract on Human Factors in Computing Systems 2000.
Rekimoto et al.: Augmented Surfaces: A Spatially Continuous Work Space for Hybrid Computing Environments. May 15, 1999, CHI 99 Conf. Proc. Human Factors in Comp. Systems.
English translation (machine-generated) of Abstract from Japanese Patent Publication No. 2002-204239A [retrieved on Mar. 17, 2014], Retrieved from the Internet: <http://worldwide.espacenet.com/publicationDetails/biblio?DB=worldwide.espacenet.com&II=1&ND=3&adjacent=true&locale=en_EP&FT=D&date=20020719&CC=JP&NR=2002204239A&KC=A>.

* cited by examiner

*Primary Examiner* — Yong H Sim

(57) ABSTRACT

A method and system for interfacing a digital device with an interactive display surface (IDS) is presented. The IDS detects the digital device when it is brought into proximity, and attempts to identify the device. The IDS communicates with the device, and displays interactive representations of information stored on the device.

20 Claims, 12 Drawing Sheets

METHOD AND SYSTEM FOR INTERFACING A DIGITAL DEVICE WITH AN INTERACTIVE DISPLAY SURFACE

TECHNICAL FIELD

Embodiments of the present invention relate to methods and systems for allowing digital computing devices to interface with an interactive display surface (IDS), in order to allow new methods of manipulating digital information stored on these devices.

BACKGROUND

Portable digital computing devices are becoming increasingly pervasive in modern culture. Such devices, including mobile telephones, personal digital assistants (PDAs), portable mp3 players, digital cameras and camcorders, and portable video game players, allow their users to carry tremendous amounts of digital information on their person with very little inconvenience. These devices are often optimized for portability, placing great emphasis on small form factors and low power consumption.

In achieving these design features, sacrifices in terms of usability have been made. Displays on such devices are often very small, when they are even present. Easy functionality is typically limited to a very few select features accessed through several primary buttons, while less frequently used options are buried deep within menus and submenus, accessed by navigating menus on the tiny integrated display. Additionally, these devices typically offer only one method of access to the user's stored digital data: digital cameras allow the user to view the picture you took on the tiny embedded LCD screen; mp3 players will allow the user to play a stored song; and a PDA will allow the user to view a compressed view of his or her schedule for the day.

Often the sole method available to a user for accessing his digital data is by connecting the device directly to a computer, and using specialized software to interface with the device, move the data to the computer. There are undesirable limitations inherent in this solution, however. In order to make use of the data, it often must be copied to the computer itself, which leaves the user's data in multiple locations. Interfacing with the computer may require a dedicated piece of software or hardware, which limits where the user can make use of his data. And some devices do not even offer this limited option to their users; data that enters such a device is inaccessible, beyond the tools built into the device itself.

Moreover, having access to his or her data only via a single desktop computer has negative implications for the utility of these devices in a social context. A user may wish to share a digital picture with a friend, but cannot do so immediately or in a social setting; he or she must return to their base computer and forward it to their friend some other time. The user might want to let a friend listen to a new song, but would be limited to handing over their mp3 player and headphones; two people cannot listen at once via a pair of earphones. Two friends might want to play a game together, but sharing a single PDA is impractical.

Some means to allow user to use, share, and manipulate content stored on an electronic device, as well as to more easily access functionality of, or appropriate to, their device is desirable.

DISCLOSURE OF THE INVENTION

A method and system for interfacing a digital device with an interactive display surface (IDS) is presented. The IDS detects the digital device when it is brought into proximity, and attempts to identify the device. The IDS communicates with the device, and displays interactive representations of information stored on the device.

A system is also presented, where an IDS is configured to interface with a digital device. The IDS comprises: a detection component, for detecting the digital device when it is brought into proximity; an identification component, which identifies the digital device; and a communication component, which communicates with the digital device. The IDS is configured to display interactive representations of information stored on the digital device.

A computer-usable medium is presented, having computer-readable program code stored thereon for causing a computer system to execute a method for allowing manipulation of digital information accessible to a digital device, through an interactive display surface (IDS). This method involves interfacing the digital device with the IDS, then displaying an interactive representation of the digital information upon the IDS. The method also involves receiving an instruction for manipulating the representation of the digital information, and causing the digital information to be manipulated in accordance with the instruction for manipulating the representation of the digital information.

A portable computing device is presented, which is capable of interacting with an interactive display surface (IDS). The portable computing device has a digital information storage, a communications port coupled to the digital information storage, and a processor coupled to the communications port. The processor is configured to execute software instructions to connect the portable computing device to the IDS through the communications port. The portable computing device is configured to display a plurality of interactive representations upon the IDS, where the plurality of interactive representations correspond to digital information stored in the digital information store. The portable computing device is also configured to be used to manipulate the plurality of interactive representations through physical motions of the portable computing device.

An interactive display surface (IDS) is presented, for displaying and manipulating data stored on a plurality of digital devices. The IDS comprises: an image-detection component, for monitoring the surface of the IDS and for observing the characteristics of the plurality of digital devices; a recognition component, for determining, from the characteristics of the plurality of digital devices, the nature of each of the digital devices; and a network component, for communicating with each of the plurality of digital devices. The IDS is configured to display interactive representations of the data stored on the plurality of digital devices, and also to be responsive to the physical interaction of a user with those interactive representations.

An interactive display surface (IDS) for communicating with a digital device is also presented. The IDS has an image-recognition system, for locating and identifying the digital device; and a communications port, for communicating with the digital device. The image-recognition system is configured to track the physical motion of the digital device. In response to such a physical motion, the IDS is configured to execute a software instruction.

A method for interfacing an interactive display surface (IDS) with a digital device is presented. The method involves establishing communications between the IDS and the digital device, and dividing the interactive surface of the IDS into a common zone and a protected zone. The protected zone is associated with the digital device. The method also involves displaying interactive representations of information upon the IDS, wherein the information is associated with the digital device, and wherein the interactive representations are displayed within the protected zone. The IDS is configured to restrict functionality related to the interactive representations while they remain within the protected zone.

A method for enabling an interactive display surface (IDS) to respond to the presence of a digital device is also presented. This method involves enabling the detection of the presence of the digital device. The method also involves enabling the identification of the digital device, enabling determining if the digital device can communicate with the IDS, enabling the retrieving of information related to the digital device, and enabling the displaying of that information upon the IDS.

DETAILED DESCRIPTION OF THE INVENTION

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Notation and Nomenclature

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIGS. 5, 6, and 7) describing the operations of this method, such steps and sequencing are exemplary. Embodiments of the present invention are well suited to performing various other steps or variations of the steps recited in the flowchart of the figure herein, and in a sequence other than that depicted and described herein.

Exemplary Computer System

Figure 1A:
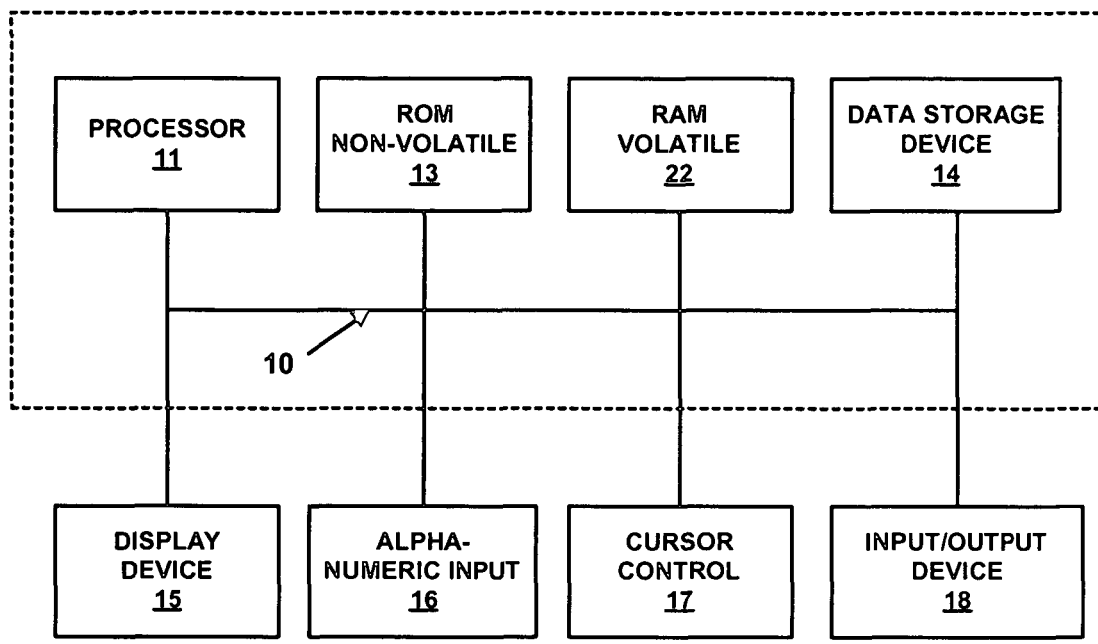
FIG. 1A is a block diagram of an exemplary computer system upon which embodiments of the present invention may be implemented.

Referring now to FIG. 1A, a block diagram of an exemplary computer system 12 is shown. It is appreciated that computer system 12 described herein illustrates an exemplary configuration of an operational platform upon which embodiments of the present invention can be implemented. Nevertheless, other computer systems with differing configurations can also be used in place of computer system 12 within the scope of the present invention. That is, computer system 12 can include elements other than those described in conjunction with FIG. 1. Moreover, the present invention may be practiced on any system which can be configured to allow it, not just computer systems like computer system 12.

Computer system 12 includes an address/data bus 10 for communicating information, a central processor 11 coupled with bus 10 for processing information and instructions; a volatile memory unit 22 (e.g., random access memory [RAM], static RAM, dynamic RAM, etc.) coupled with bus 10 for storing information and instructions for central processor 11; and a non-volatile memory unit 13 (e.g., read only memory [ROM], programmable ROM, flash memory, etc.) coupled with bus 10 for storing static information and instructions for processor 11. Computer system 12 may also contain an optional display device 15 coupled to bus 10 for displaying information to the computer user. Moreover, computer system 12 also includes a data storage device 14 (e.g., disk drive) for storing information and instructions.

Also included in computer system 12 is an optional alphanumeric input device 16. Device 16 can communicate information and command selections to central processor 11. Computer system 12 also includes an optional cursor control or directing device 17 coupled to bus 10 for communicating user input information and command selections to central processor 11. Computer system 12 also includes signal communication interface (input/output device) 18, which is also coupled to bus 10, and can be a serial port. Communication interface 18 may also include wireless communication mechanisms. Using communication interface 18, computer system 12 can be communicatively coupled to other computer systems over a communication network such as the Internet or an intranet (e.g., a local area network).

Interactive Display Surface

Figure 1B:
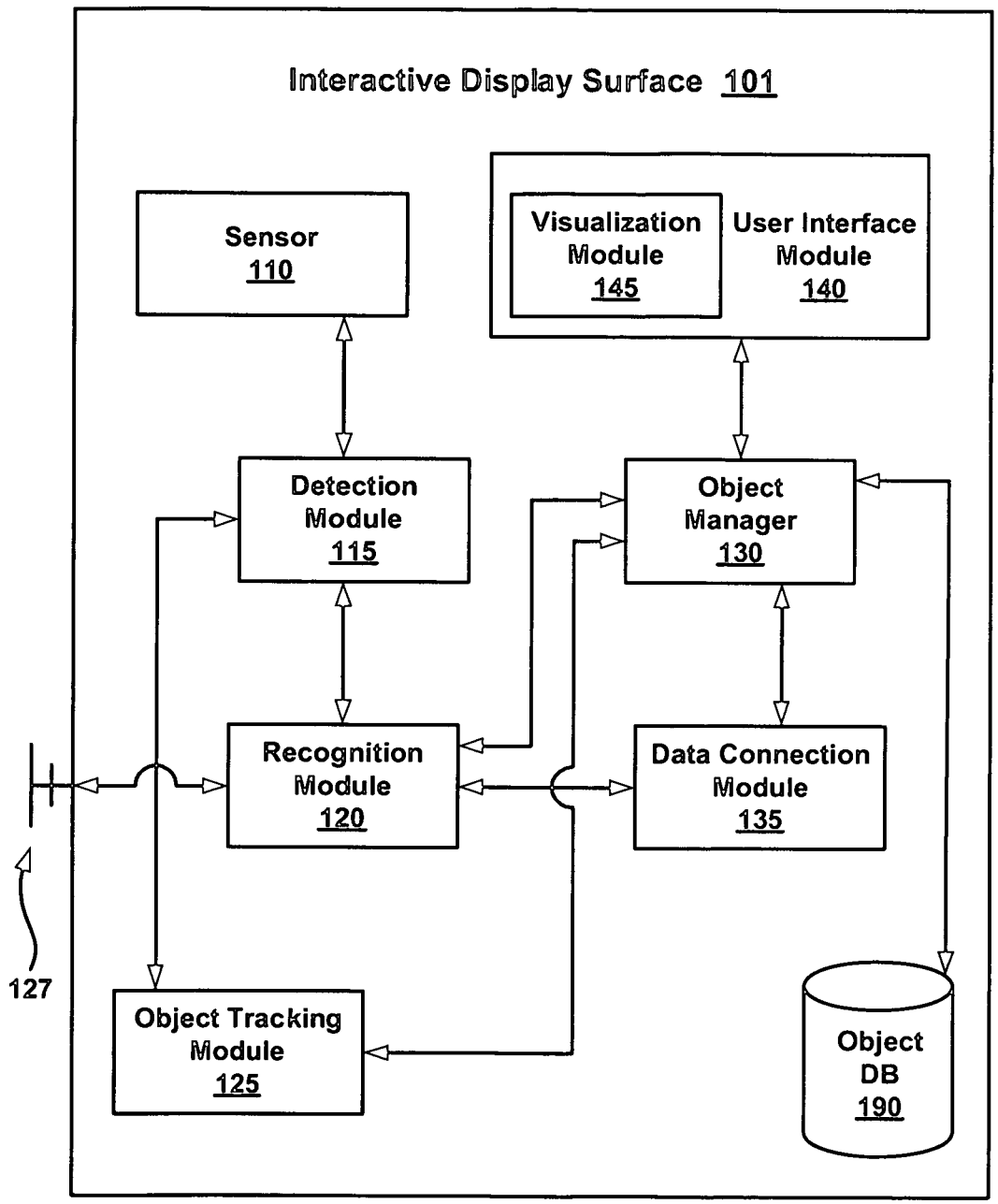
FIG. 1B is a block diagram of an interactive display surface (IDS), in accordance with one embodiment of the present invention.

With reference now to FIG. 1B, a block diagram of an interactive display surface (IDS) is shown, in accordance with one embodiment of the present invention. IDS 101 is shown as being composed of multiple interconnected modules. In different embodiments, these modules can be implemented as hardware components or as software programs, or as a combination of hardware and software. In some embodiments, the functions of these modules can be merged into fewer modules. In other embodiments, functionality of a single module can be split among several modules. In embodiments where IDS 101 is implemented at least partially as software instructions, such instructions are executed on a computer system, such as system 12. In some embodiments, IDS 101 is implemented as a table top display surface, around which users may sit or stand. In other embodiments, IDS 101 is implemented as a wall-mounted display. In other embodiments, IDS 101 is implemented in other ways.

In this embodiment, IDS 101 is depicted as having a sensor 110, a detection module 115, a recognition module 120, an object tracking module 125, an object manager 130, a data connection module 135, a user interface module 140, with a visualization module 145, and an object database 190. This embodiment also depicts an optional network connection 127.

Sensor 110, in this embodiment, is used for monitoring IDS 101. A wide selection of implementations for sensor 110 exist. In one embodiment, sensor 110 is implemented as a touch-sensitive surface. In another embodiment, sensor 110 is an arrangement of one or more cameras which monitor the surface of IDS 101. In another embodiment, sensor 110 includes a radio frequency transceiver, for detecting radio frequency identification (RFID) tags brought into proximity of IDS 101. In another embodiment, sensor 110 includes a transceiver for detecting radio signals being broadcast by an object, such as Bluetooth or 802.11 compliant signals.

Detection module 115, in this embodiment, is used to detect when an object is interacting with IDS 101, and to establish certain characteristics about the object. Detection module 115 is coupled to sensor 110, and interprets data received from sensor 110. What characteristics detection module 115 seeks to establish will vary with the nature of the implementation of sensor 110. In embodiments where sensor 110 includes a camera, detection module 115 can attempt to determine the shape, color, location, proximity, and/or orientation of the object. In such embodiments, detection module 115 can also attempt to read labels or bar codes, or to note distinguishing marks on an object. In some embodiments, detection module 115 updates these characteristics frequently, so as to note, for example, changes in position, orientation, or distance from IDS 101 of the detected object.

Recognition module 120, in this embodiment, takes the characteristics of an object from detection module 115 and attempts to determine what the object is. In some embodiments, recognition module 120 attempts to determine what type of object has been detected, e.g., a portable mp3 player of a particularly make. In other embodiments, recognition module 120 attempts to determine which specific object has been detected, e.g., this portable mp3 player, which belongs to John Smith. In order for recognition module 120 to make this determination, it requires access to information about characteristics of objects. In some embodiments, this information is stored in a device-matching database (not shown) within IDS 101. In other embodiments, recognition module 120 has access to network connection 127, and can access such information stored on a computer elsewhere on a network, or over an Internet connection. Some types of information include the profile or outline of a given object, its color, size, or shape, or the text or other identifying symbols that might be visible to sensor 110. In embodiments where recognition module 120 attempts to identify a specific object, detected characteristics such as scratches or dents in the housing of an object can be stored for later reference, and recalled to aid in recognition.

The depicted embodiment of IDS 101 includes object tracking module 125. Object tracking module 125, in some embodiments, receives location and orientation information from detection module 115, in order to determine where the detected object is located at a given moment.

Object manager 130, in this embodiment, controls and coordinates the interaction of IDS 101 with the detected object, and passes information between modules.

Object database 190, in this embodiment, is used to store information related to objects. This information can include characteristics used by recognition module 120 for recognizing objects. This information can also include network protocols for interacting with networkable objects, used by data connection module 135. This information can also include representations of various objects, or types of data stored on various objects. This last usage is described in greater detail below.

Data connection module 135, in this embodiment, is used by object manager 130 to bind the detected object to IDS 101. Bind, in this context, is used to describe a response by the IDS to the presence of the device. Binding encompasses establishing a communication pathway between IDS 101 and the object. Binding also describes situations where IDS 101 recognizes an object, but cannot communicate with it. In one embodiment, for example, where the detected object and IDS 101 are both capable of wireless communication, data communication module 135 seeks to bind the object by establishing a wireless networking connection. In another embodiment, where the detected object is, for example, a coffee cup, data connection module 135 will bind the object by, for example, causing a menu for a coffee shop to be displayed on IDS 101.

User interface module 140, in this embodiment, is the interaction point between IDS 101 and a user. In embodiments where IDS 101 is a horizontal table and sensor 110 is a touch-sensitive screen or an arrangement of one or more cameras, user interface module 140 can interact with a user anywhere around the table. User interface module 140 is used to display information for the user, and to accept input from the user.

User interface module 140, in this embodiment, includes visualization module 145. Visualization module 145 is used to display information related to the detected object, as is described in greater detail, below.

Method of Interfacing an Object with an IDS

Figure 5:
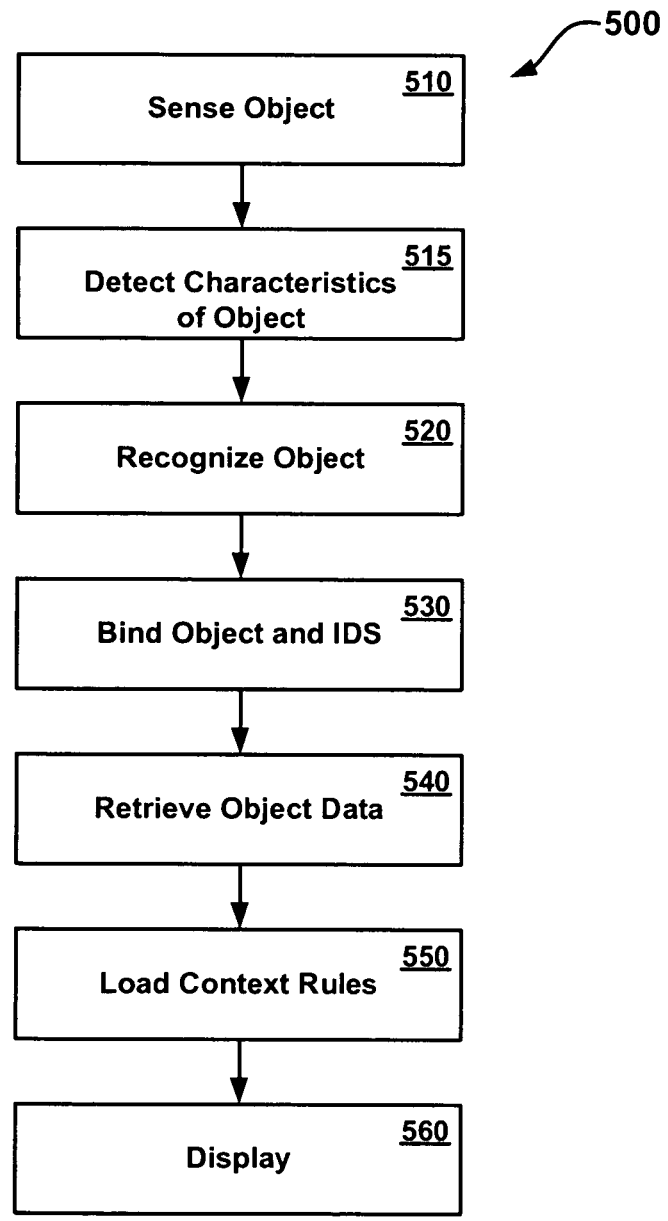
FIG. 5 depicts a flowchart of a method for interfacing an interactive display surface (IDS) with a digital device is described, in accordance with one embodiment of the present invention.

With reference now to FIG. 5, a flowchart 500 of a method for interfacing an interactive display surface (IDS) with an object is described, in accordance with one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed. In one embodiment, flowchart 500 is implemented as computer-readable program code stored in a memory unit of computer system 112 and executed by processor 11 (FIG. 1). In some embodiments of the present invention, the method described in FIG. 5 can be used to detect fingertip motions or hand gestures.

With reference now to step 510 and FIG. 1B, IDS 101, through sensor 110, senses when an object is brought into proximity. As discussed above, sensor 110 can be implemented in different ways in different embodiments. In one embodiment, where IDS 101 is implemented as part of a table-top surface, sensor 110 is implemented as one or more cameras monitoring the surface of IDS 101. In such an embodiment, sensor 110 detects an object that is placed on the surface of IDS 101. In another embodiment, sensor 110 is implemented as a radio frequency transceiver, configured to communicate with objects which incorporate Bluetooth technology. In this embodiment, sensor 110 detects a Bluetooth-enabled object when it is brought into the proximity of IDS 101.

In many embodiments, bringing an object into proximity is defined as bringing the object close enough to IDS 101 to be detected. For example, in one embodiment, bringing a Bluetooth-enabled device close enough to IDS 101 for sensor 110 to detect it will constitute bringing the object into proximity of IDS 101. In other embodiments, bringing an object into proximity requires a user to perform a particular action. These latter embodiments allow a user to refrain from binding an object to IDS 101 accidentally. In one embodiment, for example, the user must place the Bluetooth-enabled object on the surface of IDS 101, even though sensor 110 could detect it further away, before IDS 101 will attempt to bind the object. In another embodiment, IDS 101 may detect the object, and provide a simple interface for the user to choose whether or not to bind the object to IDS 101.

With reference now to step 515 and FIG. 1B, detection module 115 attempts to determine the characteristics of the object. Which characteristics can be detected varies with different embodiments of IDS 101 and sensor 110. In one embodiment, where IDS 101 is implemented as part of a table-top surface and sensor 110 is implemented as one or more cameras, detection module 115 can detect visual characteristics of the object. Such characteristics can include, but are not limited to, the observable profile of the object; its color, shape, and size; its location and orientation on the surface of IDS 101; a logo or other identifying symbols; or text or barcodes appearing on the object that are visible to sensor 110. In other embodiments, where sensor 110 is implemented as a radio frequency transceiver, detection module 115 can attempt to query the detected object in order to identify characteristics. In several embodiments, combinations of these approaches are used, in order to provide more identifying characteristics than would be possible through any single method.

In some embodiments, detection module 115 also attempts to identify unique characteristics, which differentiate one specific object from another of the same type. Examples of such unique characteristics include serial numbers, bar codes, unique scratches or markings on the object, and network identifiers, such as a MAC address associated with a wireless networking adapter.

With reference now to step 520 and FIG. 1B, IDS 101, through recognition module 120, attempts to recognize the object. Recognition involves matching the characteristics observed by detection module 115 against the profiles of known objects. In some embodiments, IDS 101 incorporates object database 190. In these embodiments, recognition module 120 compares the characteristics of the object against information stored in the database. In other embodiments, IDS 101 includes network connection 127. In these embodiments, recognition module 120 can access information stored elsewhere, e.g., over a local network, or on a centralized server over the Internet. Some embodiments incorporate a combination of object database 190 and network connection 127. In one such embodiment, object database 190 is regularly updated with additional object profiles via network connection 127.

In embodiments where recognition module 120 attempts to identify a unique object, unique characteristics observed by recognition module 115, such as those described above, are stored to aid in later recognition efforts. In some embodiments, such unique characteristics can be used to identify not only a unique object, but also a unique user. For example, a user may set a portable music device on IDS 101. This portable music device, if it has unique characteristics, can be recognized again. User interface module 140 can be configured to remember what activities or information the user of that particular portable music device was interested in during his last session. If the device is detected again, IDS 101 can provide services to the user based on his or her prior activity records.

With reference now to step 530 and FIG. 1B, IDS 101, through data connection module 135, attempts to bind the object to IDS 101. In embodiments where the object can communicate with IDS 101, e.g., through a Bluetooth connection, data connection module 135 is used to interface with the object. In embodiments where the object cannot communicate with IDS 101, e.g., through a lack of a shared communications means, data connection module 135 attempts to access information related to the device, e.g., stored in object database 190 or retrievable over network connection 127.

With reference now to step 540 and FIG. 1B, object manager 130 attempts to retrieve data associated with the object. In one embodiment, where a direct connection has been established between the object and IDS 101, object manager 130 seeks to obtain information about the contents and services available through the networked device. In another embodiment, where no connection is possible with the object, object manager 130 seeks to retrieve information related to the object. In such an embodiment, IDS 101 can retrieve information related to the object. For example, if a user places a portable mp3 player on IDS 101, and the mp3 player is recognized as not sharing any communication means with IDS 101, IDS 101 can access, over a network connection, information related to that type of portable mp3 player, or to music in general. In one such embodiment, where a portable mp3 player is detected but lacks a shared means of communication with IDS 101, IDS 101 is able to contact a music service provider and access song tracks that are associated with that particular mp3 player through, for example, a digital rights management (DRM) scheme. In another example, IDS 101 may be located in a coffee shop, and the shop's coffee cups may have unique identifiers that are visible to sensor 110, e.g., a bar code placed on the bottom of the cup and visible to cameras observing the surface of IDS 101.

With reference now to step 550 and FIG. 1B, object manager 130 loads context rules related to the object and the environment of IDS 101. In some embodiments, not all retrieved data is appropriate or desirable for display. In these embodiments, object manager 130 includes contextual rules which help govern which information is displayed, or how much information is displayed. For example, if IDS 101 is located in a coffee shop, and a user allows his personal digital assistant to interface with IDS 101, he or she likely will not want their confidential business data to be displayed across the tabletop for anyone to see. In other embodiments, contextual data includes rules on how the data should be displayed. For example, in a public place, digital photographs retrieved from a Bluetooth-enabled phone might be initially represented as blank images, whereas in a more private setting, photographs would be represented as thumbnails of the images. In other embodiments, contextual rules include limits on how much information to display at once. For example, if a digital camera stores several hundred photographs, a context rule could limit display to only the twenty most recent photographs, with the remainder available through some manipulation of options. In some embodiments, context rules are stored on and enforced by IDS 101. In other embodiments, a device can be configured to place limits on what information is accessible to IDS 101. In other embodiments, a combination of these approaches is utilized.

With reference now to step 560 and FIG. 1B, object manager 130 causes data to be displayed and interacted with, via user interface module 140 and visualization module 145. This is explained in greater detail below, with reference to FIGS. 2, 3, and 4.

System for Interfacing a Digital Device with an IDS

Figure 2A:
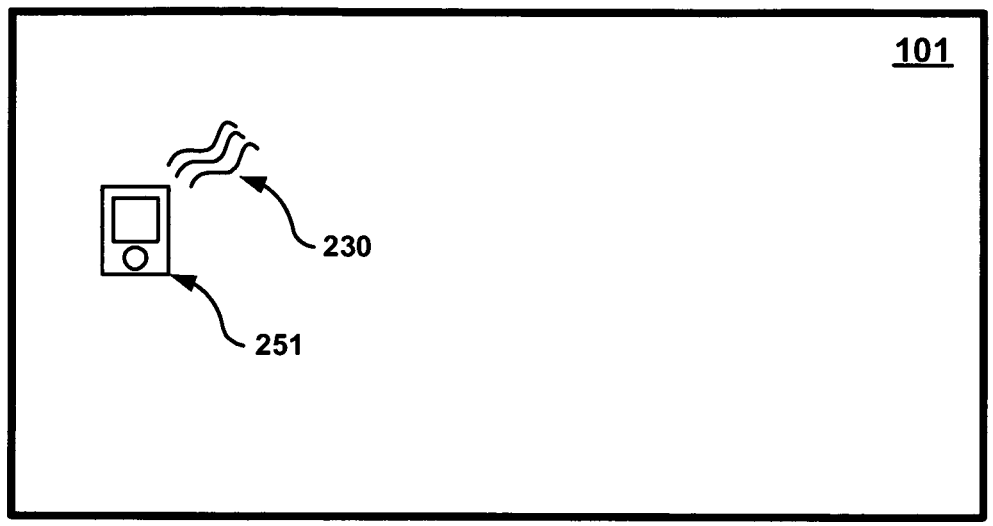
FIG. 2A is a representation of a digital device that is interfacing with an interactive display surface (IDS), in accordance with one embodiment of the present invention.

With reference now to FIG. 2A, a digital device is shown interfacing with an interactive display surface (IDS), in accordance with one embodiment of the present invention. IDS 101, as depicted in this embodiment, is a horizontal surface, similar to the surface of a table; digital device 251 is lying on top of IDS 101. In another embodiment, IDS 101 is a vertical surface, and digital device 251 is brought near IDS 101 in order to interface, but need not remain in physical contact with IDS 101 at all times. In other embodiments, other implementations and orientations of IDS 101 are used. Digital device 251 can be nearly any electronic device, including, but not limited to, mobile telephones, PDAs, digital cameras, digital camcorders, or portable game players. In this embodiment, IDS 101 and digital device 251 are depicted interfacing via a Bluetooth connection, indicated at 230; other embodiments allow for alternative methods of interfacing.

Figure 2B:
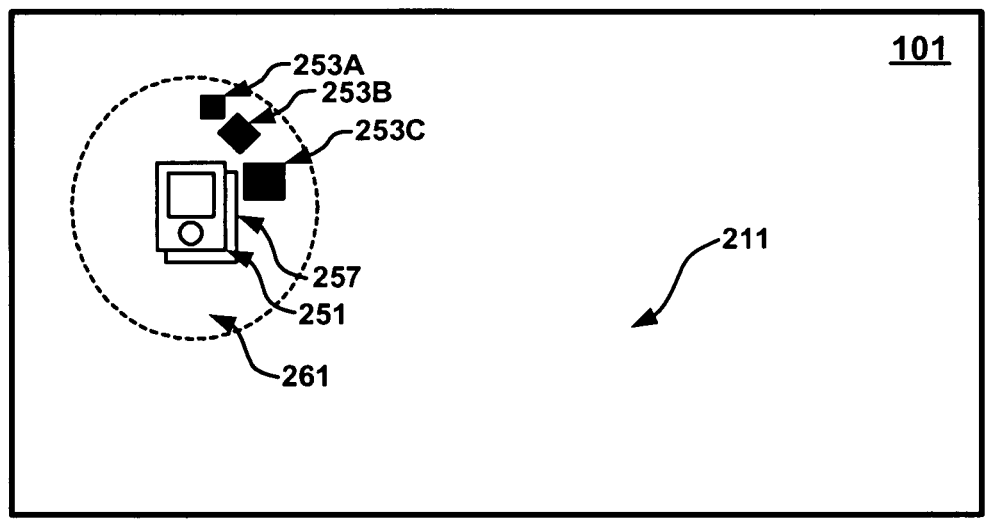
FIG. 2B is a representation of a digital device connected with an IDS, in accordance with one embodiment of the present invention.

With reference now to FIG. 2B, digital device 251 is shown connected with IDS 101, in accordance with one embodiment of the present invention. In one embodiment, IDS 101 displays a shadow representation 257 of digital device 251 in order to indicate the existence of a connection. In another embodiment, a visual ripple effect is displayed in order to indicate that a connection exists. In another embodiment, a sound is played in order to indicate that a connection exists. In other embodiments, other methods of indicating the existence of a connection are used. In other embodiments, no indication of a connection is provided.

An optional protected zone 261 is depicted around digital device 251. In this embodiment, this zone is circular, extending equally in all directions around digital device 251. In other embodiments, the shape and location of the protected zone 261 differ. In some embodiments, no protected zone is used. In one embodiment, IDS represents protected zone 261 by displaying a colored circle, corresponding to the size and shape of protected zone 261. Other embodiments have IDS 101 displaying different effects to represent protected zone 261. Other embodiments provide no representation of protected zone 261. In this embodiment, a common zone is indicated by arrow 211. Common zone 211 is the area outside of protected zone 261.

Several representations of digital information 253A, 253B, and 253C are depicted near digital device 251, in accordance with one embodiment of the present invention. In one embodiment, representations of digital information 253 represent a digital photograph. In another embodiment, representations of digital information 253 represent a digital music file. In other embodiments, representations of digital information 253 represent other electronic data.

In some embodiments, where protected zone 261 is implemented, IDS 101 prevents data from being manipulated or copied without the owner's consent. This is achieved in different embodiments in different ways. In one embodiment, for example, device 251 can contain a password, which is not displayed on IDS 101; in order to manipulate the data represented by representations of digital information 253, the user must input the password. In other embodiments, device 251 itself must be utilized to manipulate the data represented by representations of digital information 253, using device 251 to perform appropriate gestures. In other embodiments, representations of digital information 253 follow the movements of device 251, and moving device 251 such that protected zone 261 overlaps the protected zone of another device 251 allows for the data represented by representations of digital information 253 to be manipulated by either device 251. In a further embodiment, such access is one-sided, in that the data in the second device's protected zone is not available to device 251.

Figure 3:
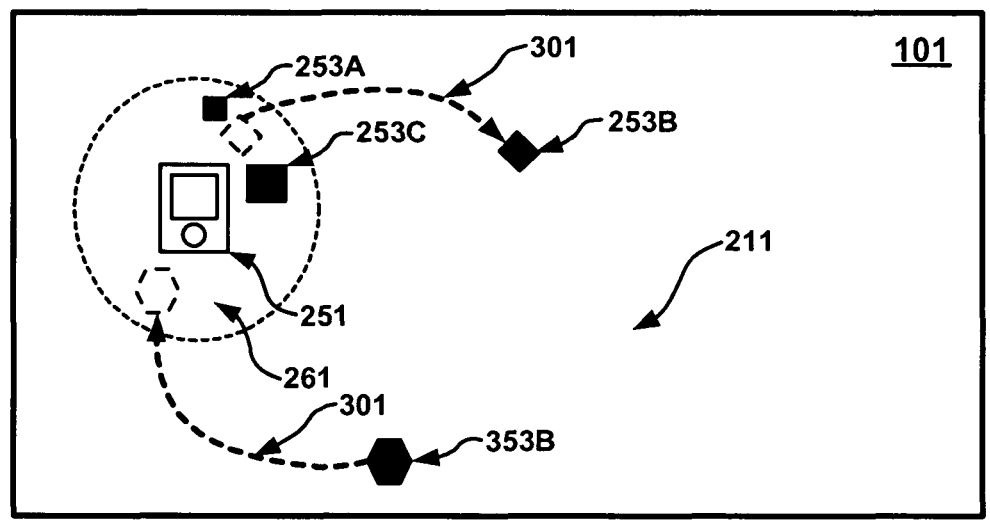
FIG. 3 depicts the manipulation of digital information displayed on an IDS, in accordance with one embodiment of the present invention
Figure 4A:
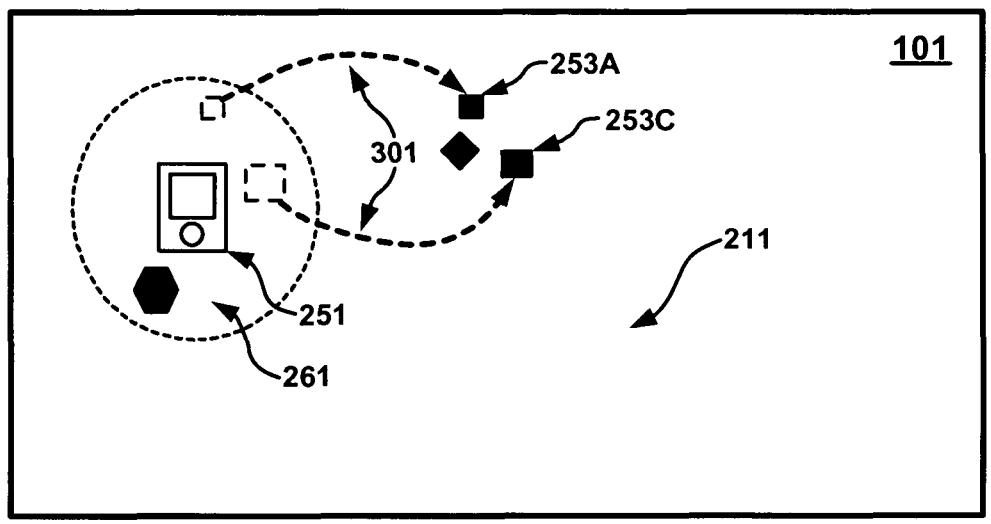
FIG. 4A depicts a user sweeping several pieces of digital information with a hand gesture, causing these pieces of digital information to move across the surface of the IDS, in accordance with one embodiment of the present invention.
Figure 4B:
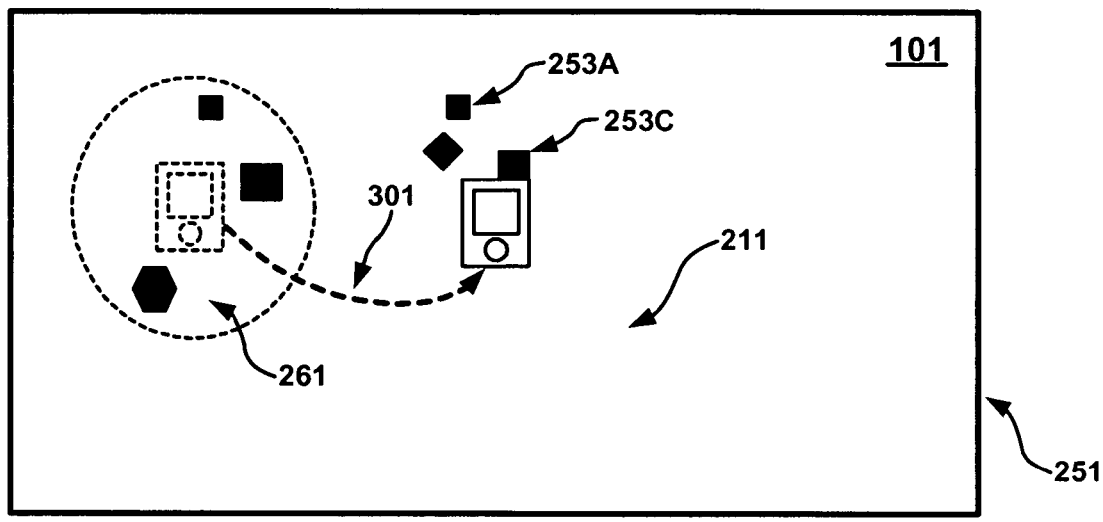
FIG. 4B depicts a user moving the digital device to contact a piece of digital information, in accordance with one embodiment of the present invention.
Figure 4C:
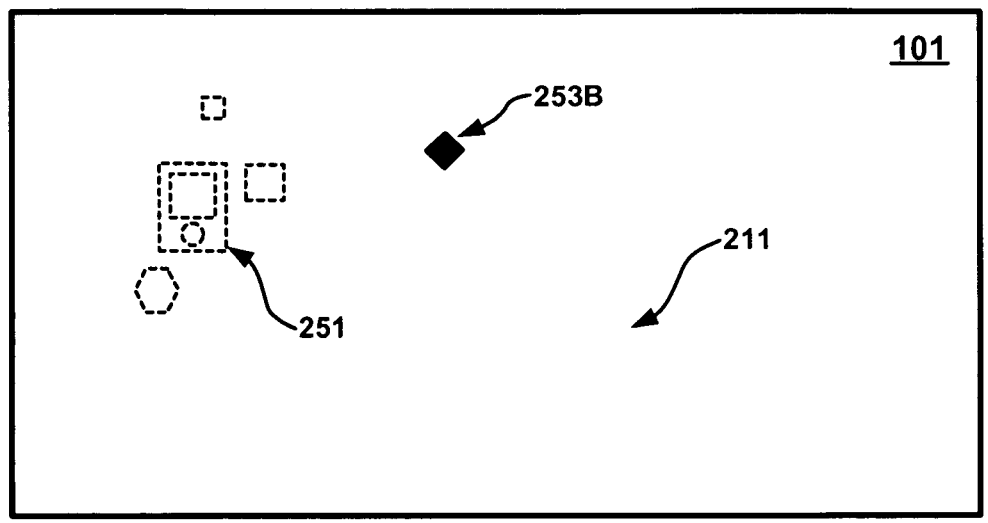
FIG. 4C depicts a user removing the digital device from the surface of the IDS, in accordance with one embodiment of the present invention.
Figure 4D:
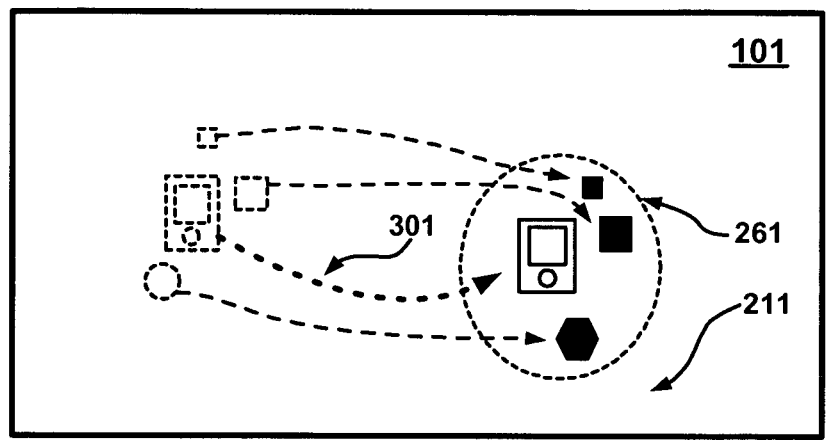
FIG. 4D depicts a user moving the digital device across the surface of the IDS, in accordance with one embodiment of the present invention.

With reference now to FIG. 3, manipulation of digital information is depicted, in accordance with one embodiment of the present invention. In one embodiment, IDS 101 is responsive to a user's hand motions, indicated by arrow 301; this is described in greater detail below, with reference to FIG. 6. User 301 can select a piece of digital information 253B and move it about on the surface of IDS 101. In one embodiment, digital information 253B can be moved outside of protected zone 261 into common zone 211. In another embodiment, user 301 can select a piece of digital information 353 and move it from common zone 211 into protected zone 261.

With reference now to FIG. 4, further manipulations of digital information are depicted, in accordance with embodiments of the present invention. In FIG. 4A, User 301 is sweeping several pieces of digital information 253A and 253C with a hand gesture, causing these pieces of digital information 253A and 253C to move across the surface of IDS 101, in accordance with one embodiment of the present invention. In FIG. 4B, a user 301 is moving digital device 251 to contact a piece of digital information 253C. In FIG. 4C, a user is removing digital device 251 from the surface of IDS 101. In FIG. 4D, a user is moving digital device 251 across the surface of IDS 101, which causes the representations of digital information within protected zone 261 to follow the motion of digital device 251, in accordance with one embodiment of the present invention.

Figure 6:
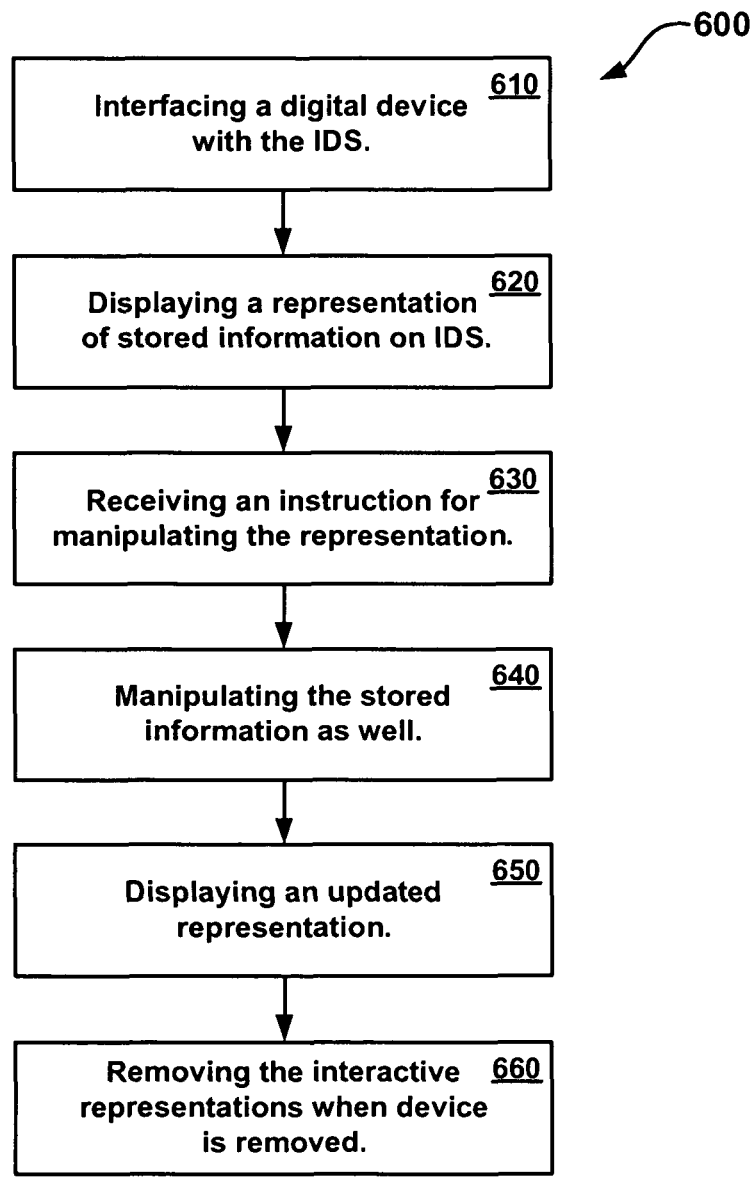
FIG. 6 depicts a flowchart of a method for allowing manipulation of digital information accessible to a digital device through an interactive display surface (IDS), in accordance with one embodiment of the present invention.

Method of Allowing Manipulation of Digital Information Accessible to a Digital Device Through an IDS With reference now to FIG. 6, a flowchart 600 of a method for allowing manipulation of digital information accessible to a digital device through an interactive display surface (IDS) is described, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed. In one embodiment, flowchart 600 is implemented as computer-readable program code stored in a memory unit of computer system 112 and executed by processor 101 (FIG. 1).

With reference now to step 610 and FIGS. 2, 3, and 4, digital device 251 is interfaced with IDS 101, in accordance with one embodiment of the present invention. In one embodiment, said interfacing is accomplished through the method described in Flowchart 500. In other embodiments, other methods of interfacing are utilized.

With reference now to step 620 and FIGS. 2, 3, and 4, IDS 101 displays interactive representations of digital information 253 accessible to digital device 251, in accordance with one embodiment of the present invention. In one embodiment, this is accomplished through the method described with reference to step 560 of Flowchart 500. In other embodiments, other methods of generating and displaying interactive representations of digital information 253 are utilized.

With reference now to step 630 and FIGS. 2, 3, and 4, IDS 101 receives an instruction for manipulation of representations of digital information 253, in accordance with one embodiment of the present invention. In one embodiment, user 301 touches representation of digital information 253B where it is displayed on IDS 101, and drags it around the display. In another embodiment, user 301 can drag representation of digital information 253B outside of protected zone 261 into common zone 211. In another embodiment, user 301 can drag representation of digital information 253B to a garbage can icon. In another embodiment, user 301 can drag representation of digital information 253B to the protected zone of another digital device interfacing with IDS 101.

In some embodiments, particular gestures are associated with particular commands. For example, in one embodiment, an instruction to duplicate a piece of data represented by digital information 253A can be executed by tapping twice on digital information 253A. In another embodiment, an instruction to copy a particular piece of data represented by digital information 253C to device 251 is accomplished by touching device 251 to digital information 253C.

In another embodiment, IDS 101 tracks user 301's hand gestures. User 301 can sweep his hand across IDS 101 and manipulate multiple representations of digital information 253. User 301 can also use multiple fingers or multiple hands to interact with multiple representations of digital information 253 simultaneously. In another embodiment, IDS 101 tracks the movements of digital device 251. Moving digital device 251 into contact with representation 253 by making a sweeping gesture can be used to absorb representations of digital information 253, essentially vacuuming, or removing, representations of digital information 253 from the surface of IDS 101 and preventing further interaction with those representations of digital information 253. In one embodiment, IDS 101 produces animated graphics appropriate to such a vacuuming function. Moving digital device 251 can be used to cause representations of digital information 253 to appear, by, for example, shaking digital device 251. In one embodiment, IDS 101 produces animated graphics appropriate to representations of digital information 253 appearing after being shaken off of digital device 251. In another embodiment, digital device 251 can be utilized to interact with representations of digital information 253, such as using digital device 251 to interact with a representation of a hockey puck, while IDS 101 simulates an air hockey table. In other embodiments, other methods of receiving an instruction for the manipulation of representations of digital information 253 are utilized. In another embodiment, moving digital device 251 across the surface of IDS 101 causes the representations of digital information 253 to move across the display as well, "following" digital device 251.

Some embodiments use digital device 251 to provide security for protected zone 261. In such an embodiment, information cannot be dragged outside of protected zone 261 except by using digital device 251 as a dragging tool. In another such embodiment, information cannot be dragged outside of protected zone 261 at all; instead, when digital device 251 moves across the surface of IDS 101, protected zone 261 follow. By moving digital device 251 to a position such that protected zone 261 overlaps with the protected zone of another digital device, and then moving the representation of protected information to a point where it is present in both protected zones simultaneously, information can be transferred between the two digital devices.

With reference now to step 640 of FIGS. 2, 3, and 4, IDS 101 causes digital information accessible to digital device 251 to be manipulated in accordance with the instruction received for manipulation of representations of digital information 253, in accordance with one embodiment of the present invention.

In one embodiment, the digital information represented by representations of digital information 253 is not downloaded to IDS 101. Instead, manipulation of representations of digital information 253 causes manipulation of the actual digital information. This allows for greater security for user 301, as the user can interface his digital device 251 with IDS 101, manipulate his data, and leave, all without losing control of copies of his digital information. In another embodiment, when user 301 drags representation of digital information 253B outside of protected zone 261 into common zone 211, the digital information represented by representation of digital information 253B is downloaded to IDS 101, and other users can make use of this digital information by further manipulating representation of digital information 253B. In another embodiment, when user 301 drags representation of digital information 253B out of protected zone 261 into common zone 211, other users may manipulate representation of digital information 253B, but are limited to copying the digital information represented by representation of digital information 253B; the digital information represented by representation of digital information 253B is not downloaded or deleted from digital device 251.

With reference now to step 650 and FIGS. 2, 3, and 4, IDS 101 displays updated representations of digital information 253, in accordance with one embodiment of the present invention. In one embodiment, after the digital information represented by representations of digital information 253 has been manipulated according to the instruction received for manipulating representations of digital information 253, IDS 101 updates representations of digital information 253 to reflect the changed status of the digital information accessible to digital device 251.

With reference now to step 660 and FIGS. 2, 3, and 4, representations of digital information 253 are removed from IDS 101 when digital device 251 is no longer in proximity to IDS 101, in accordance with one embodiment of the present invention. In one embodiment, the method described in conjunction with step 550 is utilized. In other embodiments, other methods are utilized. In another embodiment, when digital device 251 is removed from proximity of IDS 101, any representations of digital information 253 related to digital device 251 are removed from IDS 101, even if a representation of digital information 253B was previously dragged from protected zone 261 to common zone 211. In another embodiment, any representations of digital information 253 that were dragged outside of protected zone 261 remain after digital device 251 is no longer in proximity to IDS 101.

Method for Enabling an IDS to Respond to the Presence of a Digital Device

Figure 7:
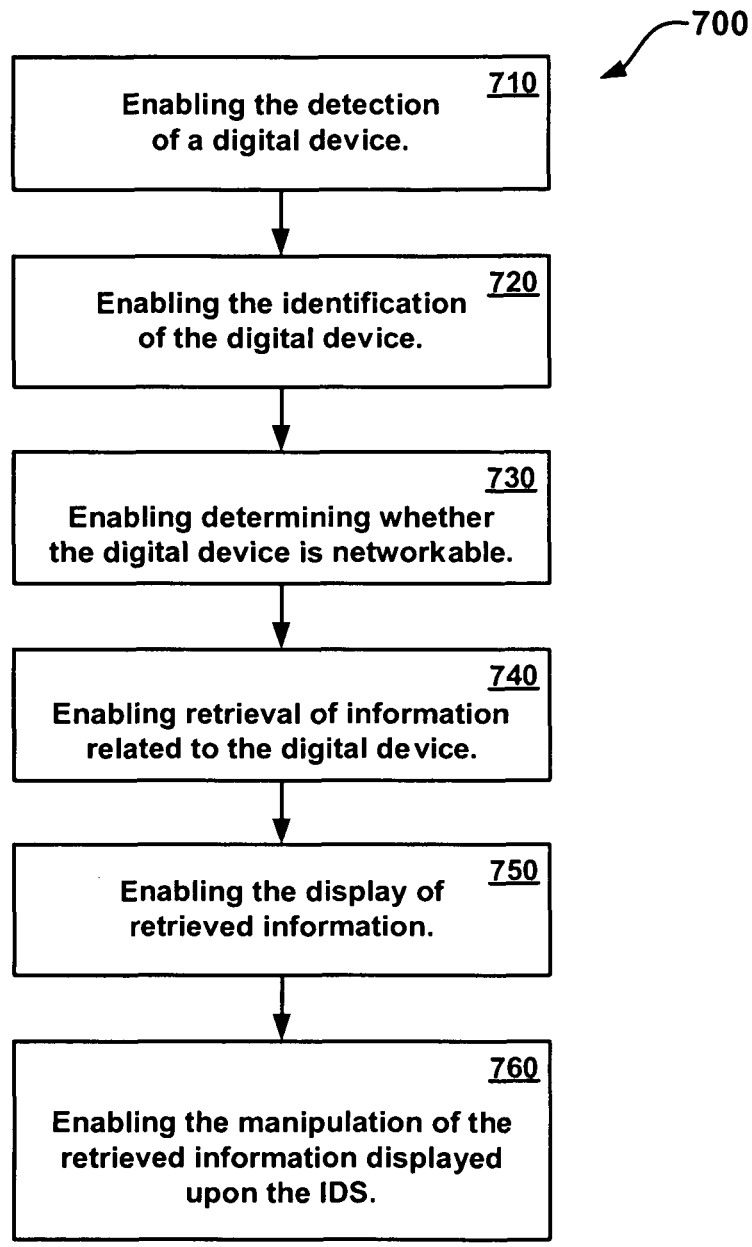
FIG. 7 depicts a flowchart of a method for enabling an IDS to respond to the presence of a digital device is described, in accordance with one embodiment of the present invention.

With reference now to FIG. 7, a flowchart 700 of a method for enabling an IDS to respond to the presence of a digital device is described, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed. In one embodiment, flowchart 700 is implemented as computer-readable program code stored in a memory unit of computer system 112 and executed by processor 101 (FIG. 1).

With reference now to step 710 and FIGS. 2, 3, and 4, IDS 101 is configured to allow the detection of digital device 251, in accordance with one embodiment of the present invention. In one embodiment, IDS 101 is configured to implement the method discussed above with reference to steps 510 and 515. In other embodiments, other methods of detecting digital device 251 are enabled.

With reference now to step 720 and FIGS. 2, 3, and 4, IDS 101 is configured to enable the identification of digital device 251, in accordance with one embodiment of the present invention. In one embodiment, IDS 101 is configured to implement the method discussed with reference to step 520. In other embodiments, other methods of identifying digital device 251 are enabled.

With reference now to step 730 and FIGS. 2, 3, and 4, IDS 101 is configured to determine if digital device 251 can communicate with IDS 101, in accordance with one embodiment of the present invention. In one embodiment, IDS 101 is configured to attempt to query digital device 251 directly using various network communication means, including Bluetooth, 802.11a, 802.11b, or 802.11g, infrared, UWB, a physical docking station, a bus connection such as USB or Firewire, or any other wireless or physical connection that allows for communication. In another embodiment, IDS 101 is configured to receive signals from digital device 251 that provide IDS 101 with information about communicating with digital device 251.

In another embodiment, IDS 101 is configured to allow access to stored information. Such information could be stored locally, e.g., in a database internal to IDS 101, which specifies whether digital device 251 specifically, or the class digital device 251 belongs to, is capable of communicating with IDS 101. Such information could also be retrievable over a network, e.g., an internet connection, such that IDS 101 could search for external information as to whether digital device 251 is capable of communicating with IDS 101. In other embodiments, other methods are utilized to enable IDS 101 to determine if digital device 251 can communicate with it.

With reference now to step 740 and FIGS. 2, 3, and 4, IDS 101 is configured to allow the retrieval of information related to digital device 251, in accordance with one embodiment of the present invention. In one embodiment, IDS 101 is configured to implement the method discussed with reference to Flowchart 500, and the information related to digital device 251 is the digital information accessible to digital device 251, as well as the functions digital device 251 can make available to IDS 101. In other embodiments, other methods of retrieving information related to digital device 251 directly from the device are enabled.

In another embodiment, IDS 101 is configured to allow the retrieval of information related to digital device 251 over a network connection, e.g., an internet connection. In this embodiment, IDS 101 may retrieve information other than what digital device 251 can provide or what information digital device 251 has access to. For example, if digital device 251 were an mp3 player, IDS 101 could retrieve information or value-added content provided by the manufacturer of the mp3 player, or could display advertisements related to the mp3 player, or could access online retailers of mp3 format digital music files. In other embodiments, other related information could be retrieved.

With reference now to step 750 and FIGS. 2, 3, and 4, IDS 101 is configured to display retrieved information related to digital device 251, in accordance with one embodiment of the present invention. In one embodiment, IDS 101 is configured to implement the method described with reference to step 540, in order to display services available to digital device 251 and digital information accessible to digital device 251.

In another embodiment, where IDS 101 is configured to retrieve related information over a network connection, e.g., and internet connection, related information is displayed on IDS 101 in proximity to the representation of digital device 251. Such information displayed may or may not be interactive, depending on the nature of the information retrieved. In alternative embodiments, information retrieved may be displayed anywhere on IDS 101, or presented to a user via an alternative method, such as playing music. Other embodiments enable other methods of displaying information related to digital device 251 on IDS 101.

With reference now to step 760 and FIGS. 2, 3, and 4, IDS 101 is configured to allow the manipulation of information related to digital device 251 displayed on IDS 101, in accordance with one embodiment of the present invention. In one embodiment, IDS 101 is configured to implement the method described with reference to Flowchart 600 for the manipulation of representations of digital information 253 displayed on IDS 101. In another embodiment, where IDS 101 is configured to retrieve information related to digital device 251 over a network connection, e.g. an internet connection, a method similar to that described with reference to Flowchart 600 is enabled, allowing for the manipulation of information displayed on IDS 101 through the use of the interactive surface of IDS 101. Other embodiments enable other methods of manipulating data displayed on IDS 101.

Embodiments of the present invention are thus described. While the present invention has been described in particular embodiments, it should be appreciated that the present invention should not be construed as limited by such embodiments, but rather construed according to the following claims.

What is claimed is:

1. A method for interfacing an interactive display surface (IDS) with a digital device, said method comprising:
   detecting said digital device when said digital device is brought into proximity of said IDS;
   identifying said digital device;
   establishing communications between said IDS and said digital device;
   displaying interactive representations of information upon said IDS, wherein said information is associated with said digital device and wherein a first interactive representation is displayed in a protected zone of said IDS, where functionality related to said first interactive representation is restricted while within said protected zone, and a second interactive representation is displayed in a common zone of said IDS, where functionality related to said second interactive representation is not restricted while within said common zone, wherein said first interactive representation and said second interactive representation are portions of said information that is associated with said digital device;
   detecting a second physical object, which is not a digital device and is not electronic, when said second object is brought into proximity of said IDS, wherein said second physical object is detected without establishing communication between said IDS and said second physical object; and
   displaying information related to said second object upon said IDS.

2. The method of claim 1, further comprising:
   displaying a representation of said digital device upon said IDS,
   wherein said displaying interactive representations comprises:

causing said interactive representations to appear to spill away from said representation of said digital device, across some portion of said IDS.

3. The method of claim 1, further comprising:
removing said interactive representations from said IDS when said digital device is removed from proximity of said IDS.

4. The method of claim 3, wherein said removing said interactive representations comprises:
causing said interactive representations to appear to be dragged across some portion of said IDS.

5. The method of claim 1, wherein said IDS comprises a horizontal surface, and wherein detecting said digital device comprises detecting said digital device when it is placed upon said horizontal IDS.

6. The method of claim 2, wherein said displaying interactive representations further comprises:
displaying interactive representations of information, wherein said information is associated with said digital device and with a specified context.

7. A system, comprising:
An interactive display surface (IDS) configured to interface with a digital device comprising:
a detection component, for detecting said digital device when it is brought into proximity of said IDS;
an identification component coupled with said detection component, which identifies said digital device;
a communication component coupled with said identification component, which communicates with said digital device,
wherein said IDS is configured to display interactive representations of information stored on said digital device and wherein said IDS is configured to display a first interactive representation in a protected zone of said IDS, where functionality related to said first interactive representation is restricted while within said protected zone, and is configured to display a second interactive representation in a common zone of said IDS, where functionality related to said second interactive representation is not restricted while within said common zone, wherein said first interactive representation and said second interactive representation are portions of said information that is associated with said digital device; and
said detection component configured for detecting a second physical object, which is not a digital device and is not electronic, when said second object is brought into proximity of said IDS, wherein said second physical object is detected without establishing communication between said IDS and said second physical object,
wherein said IDS is configured to display information related to said second object upon said IDS.

8. The system of claim 7, further comprising:
a digital device, comprising:
a digital information storage;
a communications port coupled to said digital information storage; and
a processor coupled to said communications port, said processor configured to execute software instructions to connect to said IDS through said communications port.

9. The system of claim 7, wherein said IDS comprises a horizontal surface.

10. The system of claim 9, wherein said detection component is configured to detect said digital device when said digital device is placed upon said horizontal surface.

11. The system of claim 10, wherein said IDS is configured to display a representation of said digital device in proximity to said digital device upon said horizontal surface.

12. The system of claim 7, wherein said detection component comprises a radio frequency transceiver.

13. The system of claim 8, wherein said IDS further comprises:
an object tracking component coupled with said detection component, for tracking changes in location of said digital device while in proximity of said IDS.

14. The system of claim 13, wherein said object tracking component comprises a camera.

15. The system of claim 13, wherein changes in location of said digital device while in proximity of said IDS causes changes in displaying of said interactive representations.

16. The system of claim 7, wherein said identification component comprises a database.

17. A non-transitory computer-usable medium having computer-readable program code stored thereon for causing a computer system to execute a method for allowing manipulation of digital information accessible to a digital device, through an interactive display surface (IDS), said method comprising:
interfacing said digital device with said interactive display surface;
displaying an interactive representation of said digital information upon a common zone of said IDS, where functionality related to said interactive representation is not restricted while within said common zone and wherein displaying a second interactive representation in a protected zone of said IDS restricts functionality related to said second interactive representation while within said protected zone, wherein said first interactive representation and said second interactive representation are portions of said information that is associated with said digital device;
receiving an instruction for manipulating said representation of said digital information;
causing said digital information to be manipulated in accordance with said instruction for manipulating said representation of said digital information;
interfacing a second physical object, which is not a digital device and is not electronic, when said second object is brought into proximity of said IDS, wherein said second physical object is detected without establishing communication between said IDS and said second physical object; and
displaying information related to said second object upon said IDS.

18. The non-transitory computer-usable medium of claim 17 wherein said displaying an interactive representation further comprises:
causing said interactive representation to appear to spill across said IDS.

19. The non-transitory computer-usable medium of claim 17, further comprising:
causing said interactive representation of said digital information to be removed from said IDS, when said digital device is no longer interfaced with said IDS.

20. The non-transitory computer-usable medium of claim 17 further comprising:
displaying a representation of said digital device in proximity to said digital device upon said IDS.

* * * * *